United States Patent [19]

Chen et al.

[11] Patent Number: 4,577,000

[45] Date of Patent: Mar. 18, 1986

[54] CHEMICALLY STABLE STIFF BACKBONE POLYMERS AS MOBILITY CONTROL AGENTS IN OIL RECOVERY

[75] Inventors: Catherine S. H. Chen, Berkeley Heights; Albert L. Williams, Princeton, both of N.J.

[73] Assignee: Mobil Oil Corporation, New York, N.Y.

[21] Appl. No.: 426,590

[22] Filed: Sep. 29, 1982

[51] Int. Cl.$^4$ ............... C08G 65/48; C08G 75/20; C08G 75/23
[52] U.S. Cl. ................ 525/534; 252/8.55 D; 525/535; 528/172; 528/174; 528/175; 528/210; 528/212; 528/215; 528/216
[58] Field of Search ............... 528/172, 174, 175, 210, 528/212, 215, 216; 525/534, 535

[56] References Cited

U.S. PATENT DOCUMENTS

| | | | |
|---|---|---|---|
| 3,481,885 | 12/1969 | Radlmann et al. | 525/534 |
| 4,058,504 | 11/1977 | Yonemitsu et al. | 525/534 |
| 4,156,771 | 5/1979 | Loucks et al. | 525/534 |

*Primary Examiner*—Lester L. Lee
*Attorney, Agent, or Firm*—Alexander J. McKillop; Michael G. Gilman; Charles J. Speciale

[57] ABSTRACT

Certain water-soluble polymers retain their viscosities in high brine environments and are highly useful as surfactant-mobility control agents in oil recovery processes. These polymers have stiff backbone chains which are poly-2,6-dimethyl-p-phenylene oxide, polysulfone or poly(p-phenylene ether-sulfone) and side chains which may be formed by halomethylating phenyl rings of these backbone chains followed by quaternizing the halomethyl groups. For more thickening power, the molecular weight of the polymer can be increased by controlled cross-linking with a calculated amount of difunctional amine.

11 Claims, No Drawings

CHEMICALLY STABLE STIFF BACKBONE POLYMERS AS MOBILITY CONTROL AGENTS IN OIL RECOVERY

BACKGROUND OF THE INVENTION

This invention is directed to novel synthetic water-soluble polymers and their use as surfactant-mobility control agents in oil recovery processes.

In the recovery of oil from oil-bearing reservoirs, it usually is possible to recover only minor portions of the original oil in place by the so-called primary recovery methods which utilize only the natural forces present in the reservoir. Thus a variety of supplemental recovery techniques have been employed in order to increase the recovery of oil from subterranean reservoirs. The most widely used supplemental recovery technique is waterflooding which involves the injection of water into an oil-bearing reservoir. As the water moves through the reservoir, it acts to displace oil therein to a production system composed of one or more wells through which the oil is recovered.

One difficulty often encountered in waterflooding operations is the relatively poor sweep efficiency of the aqueous displacing medium; that is, the injected displacing medium tends to channel through certain portions of the reservoir as it travels from the injection system to the production system and to bypass other portions. Such poor sweep efficiency or macroscopic displacement efficiency may be due to a number of factors such as differences in the mobilities of the injected displacing liquids and the displaced reservoir oil and permeability variations within the reservoir which encourage preferential flow through some portions of the reservoir at the expense of other portions.

Various techniques have been proposed in order to improve the sweep efficiency of the injected displacing medium and thus avoid premature breakthrough at one or more of the wells comprising the production system. The most widely used procedure involves the addition of thickening agents to the injected displacing medium in order to increase the viscosity thereof and thus decrease its mobility to a value equal to or less than the mobility of the displaced reservoir oil, resulting in a "mobility ratio" of oil to water which is less than or equal to one. Many polymeric thickening agents including both anionic and cationic polyelectrolytes have been proposed for use in such mobility control operations. Thus, U.S. Pat. No. 3,085,063 discloses waterflooding in which the water is thickened by the addition of polyvinyl aromatic sulfonates such as sulfonated polystyrene and copolymers of such vinyl aromatic sulfonates. Similarly, U.S. Pat. No. 3,984,333 discloses waterflooding involving the injection of an aqueous solution thickened by block copolymers in which the water-soluble blocks are sulfonated polyvinylarenes and the relatively water-insoluble blocks are polymerized alpha olefins and/or hydrogenated dienes such as polyisoprene and polybutadiene. Synthetic anionic polymers such as the widely used partially hydrolyzed polyacrylamides, suffer a number of disadvantages in actual operations. Where the injected water or the reservoir water contains as little as 0.5% of dissolved inorganic salts, this viscosity yield is decreased more than 80%. Also U.S. Pat. No. 3,969,592 discloses water-soluble polymers manufactured by treating an aqueous suspension of protein with selected enzymes.

Also U.S. Pat. No. 4,110,232 discloses a waterflooding process for producing oil wherein an aqueous solution of a copolymer formed of hydrophobic olefinic segments and cationic aromatic segments is injected into oil-containing subterranean formation, and U.S. Pat. No. 4,222,881 discloses a waterflood oil recovery process involving the use of an amphoteric polyelectrolyte as a thickening agent for mobility control comprising a copolymer of a quaternary vinyl pyridinium sulfonate-styrene block copolymers.

Also U.S. Pat. No. 4,284,517 and U.S. Pat. No. 4,317,893 describe an anionic polymeric surfactant and viscosifier formed by reacting a polymer including succinic anhydride moieties with a primary amine to provide a polymeric reaction product in which at least 20 mol percent of the anhydride moieties have been converted, by reaction with said amine, to succinimide or succinamide groups.

Most water-soluble polymers lose their thickening power in the presence of salts or other electrolytes. The loss of thickening power is due to the change of conformation of the polymer chains. In distilled water, due to charge repulsion of neighboring groups, the polymer chains exist in a highly extended conformation which results in a large hydrodynamic volume and consequently a high solution viscosity. In the presence of excess small electrolytes, due to charge screening the polymer chains exist in a coiled conformation which results in a small hydrodynamic volume and consequently a low solution viscosity. In oil recovery from most reservoirs the polymers must function under a brine environment. To date certain polysaccharides, such as xanthan gum, have been found to maintain a reasonable viscosity in high brine solutions. This solution property of the polysaccharides appears to be attributable to the transformation to the stiff helical conformation in the presence of electrolytes. The usual more flexible water-soluble polymers coil and become more compact in the presence of electrolytes, consequently lose water thickening power. However, the above-described polysaccharides easily hydrolytically degrade through the unstable hemiacetal linkages in the polymer main and side chains.

SUMMARY OF THE INVENTION

According to one aspect of the invention there is provided a water soluble polymer of the formula

wherein $R_1$ is a stiff polymeric backbone consisting essentially of repeating units selected from the group consisting of

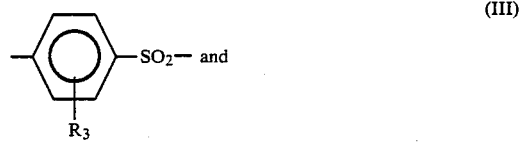

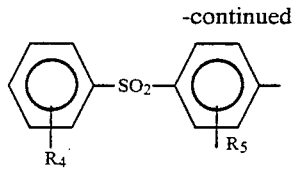

where $R_2$, $R_3$, $R_4$ and $R_5$ comprise hydrogen and moieties of the formula

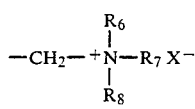

where X is halogen and $R_6$, $R_7$ and $R_8$ are the same or different and are $C_1$–$C_{20}$, substituted or unsubstituted, hydrocarbyl groups, provided that $R_8$ is absent when the moiety

forms a pyridyl ring, further provided that said

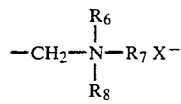

moieties are present in an amount sufficient to solubilize said polymer (I), said polymer (I) being water insoluble if all of $R_2$, $R_3$, $R_4$ and $R_5$ were hydrogen. Preferably, at least 10% of the $R_2$, $R_3$, $R_4$ and $R_5$ moieties present are not hydrogen.

While the above described polymers preferably consist entirely of the units (II), (III) and (IV), these polymers may also contain a minor proportion of other units provided that the desired properties of the overall polymer are not substantially reduced. In other words, the overall polymer should remain stiff-chained, thermally stable, brine tolerant and capable of viscosifying water.

When $R_8$ is absent and the moiety

forms a pyridyl ring, the moiety

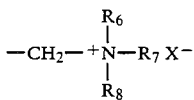

may be represented by the formula

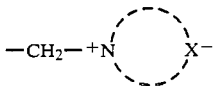

wherein the moiety

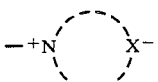

represents a pyridyl ring structure which may be substituted (e.g., with 1-3 $C_{1-4}$ alkylgroups) or, preferably, unsubstituted. The moiety

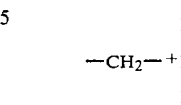

is preferably

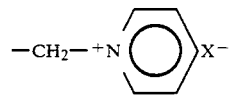

or

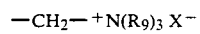

where $R_9$ is $C_{1-4}$ alkyl.

X is preferably Cl.

An example of a polymer according to an aspect of the present invention has repeating polymeric units are of the formula

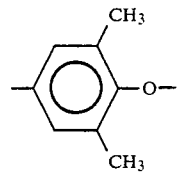

and

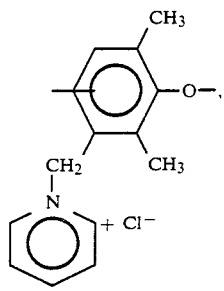

where the number of said units of formula (VI) is from about 60 to about 70% of the total number of said units of formulae (V) and (VI) and wherein the Mn of said polymer is from about 40,000 to about 200,000.

According to another aspect of the invention, there is provided a method for chemically linking quaternary ammonium groups to a stiff chain, thermally stable polymer selected from the group consisting of poly-2,6-dimethyl-p-phenylene oxide, polysulfone, and poly(p-phenylene ether-sulfone), said method comprising the steps of:

(i) halomethylating said polymer; and (ii) quaternizing halomethyl groups obtained from said halomethylating step (i).

For example, in the above recited method at least 40% of the phenyl rings of said polymer may be halomethylated in said halomethylating step (i) and at least 50% of the halomethyl groups obtained according to said halomethylating step (i) may be quaternized according to said quaternization step (ii). Preferably, said halomethylating step (i) is a chloromethylating step. In said quaternizing step (ii), said halomethylated polymer obtained according to said halomethylating step (i) may be reacted with an amine which is pyridine or of the formula $$\begin{array}{c} R_{10} \\ | \\ N-R_{11} \\ | \\ R_{12} \end{array}$$

where $R_{10}$, $R_{11}$ and $R_{12}$ are the same or different and are $C_1$-$C_{20}$, substituted or unsubstituted, hydrocarbyl groups. Also, in said quaternizing step (ii), said halomethylated polymer obtained according to said halomethylating step (i) may be reacted with a diamine capable of crosslinking said polymer. An example of such a crosslinking diamine is 1,2-bis(4-pyridyl)ethane.

According to another aspect of the invention, there is provided a crosslinked polymer prepared as described above with a crosslinking diamine.

According to another aspect of the invention, there is provided in a method of recovering oil from an oil containing subterranean formation penetrated by one or more injection wells and a production well and wherein an aqueous fluid is injected via said injection well, or wells, into said formation to displace said oil to said production well, the improvement comprising: employing in at least a portion of said aqueous fluid injected via said injection well, or wells, into said formation a water-soluble polymer as described above, particularly one having a molecular weight of at least 10,000, said polymer being employed in a sufficient amount to thicken said portion of said aqueous fluid and provide improved efficiency in displacing said oil to said production well, said water-soluble polymer being a stiff chain, thermally stable polymer, the backbone chain of said polymer being selected from the group consisting of poly-2,6-dimethyl-p-phenylene oxide, polysulfone, and poly(p-phenylene ether-sulfone), said backbone chains having side chains chemically linked to phenyl rings of said backbone chains, said side chains being either of the formula $$-CH_2-{}^+N(R_{13})_3$$
$$Cl^-$$

or of the formula

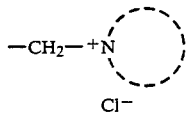

where $R_{13}$ is a $C_1$-$C_6$, substituted or unsubstituted, alkyl group, and the moiety

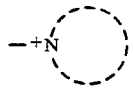

represents a pyridyl ring structure which may be substituted or unsubstituted.

According to another aspect of the invention, there is provided in a method of recovering oil from an oil containing subterranean formation penetrated by one or more injection wells and a production well and wherein an aqueous fluid is injected via said injection well, or wells, into said formation to displace said oil to said production well, the improvement comprising: employing in at least a portion of said aqueous fluid injected via said injection well, or wells, into said formation a water-soluble polymer having a molecular weight of at least 10,000, said polymer being employed in a sufficient amount to thicken said portion of said aqueous fluid and provide improved efficiency in displacing said oil to said production well, said water-soluble polymer being a crosslinked, stiff chain, thermally stable polymer as described above, particularly one having the backbone chains of said polymer being selected from the group consisting of poly-2,6-dimethyl-p-phenylene oxide, polysulfone, and poly(p-phenylene ether-sulfone), said backbone chains being crosslinked by side chains chemically linked to phenyl rings of two of said backbone chains, said side chains being either of the formula $$-CH_2-{}^+N(R_{13})_2-R_{14}-{}^+N(R_{13})_2-CH_2-$$
$$Cl^- \qquad\qquad Cl^-$$

or of the formula

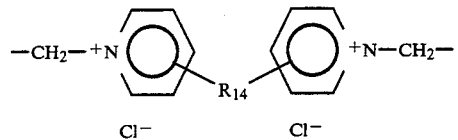

where $R_{13}$ is a $C_1$-$C_6$, substituted or unsubstituted, alkyl group and $R_{14}$ is a $C_1$-$C_6$, substituted or unsubstituted, alkylene group.

DETAILED DESCRIPTION

Poly-2,6-dimethyl-p-phenylene oxide, polysulfone, poly(p-phenylene ether-sulfone) are examples of stiff chained, thermally stable engineering resins which can be functionalized to be water and brine soluble. The phenyl rings can be easily chloromethylated and quaternized to form strong ionic groups which are not affected by divalent or multivalent metal ions. The following scheme illustrates such conversion using poly-2,6-dimethyl-p-phenylene oxides as the starting polymer.

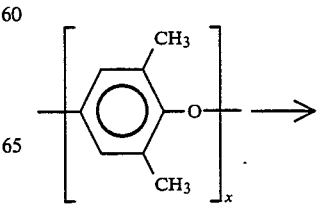

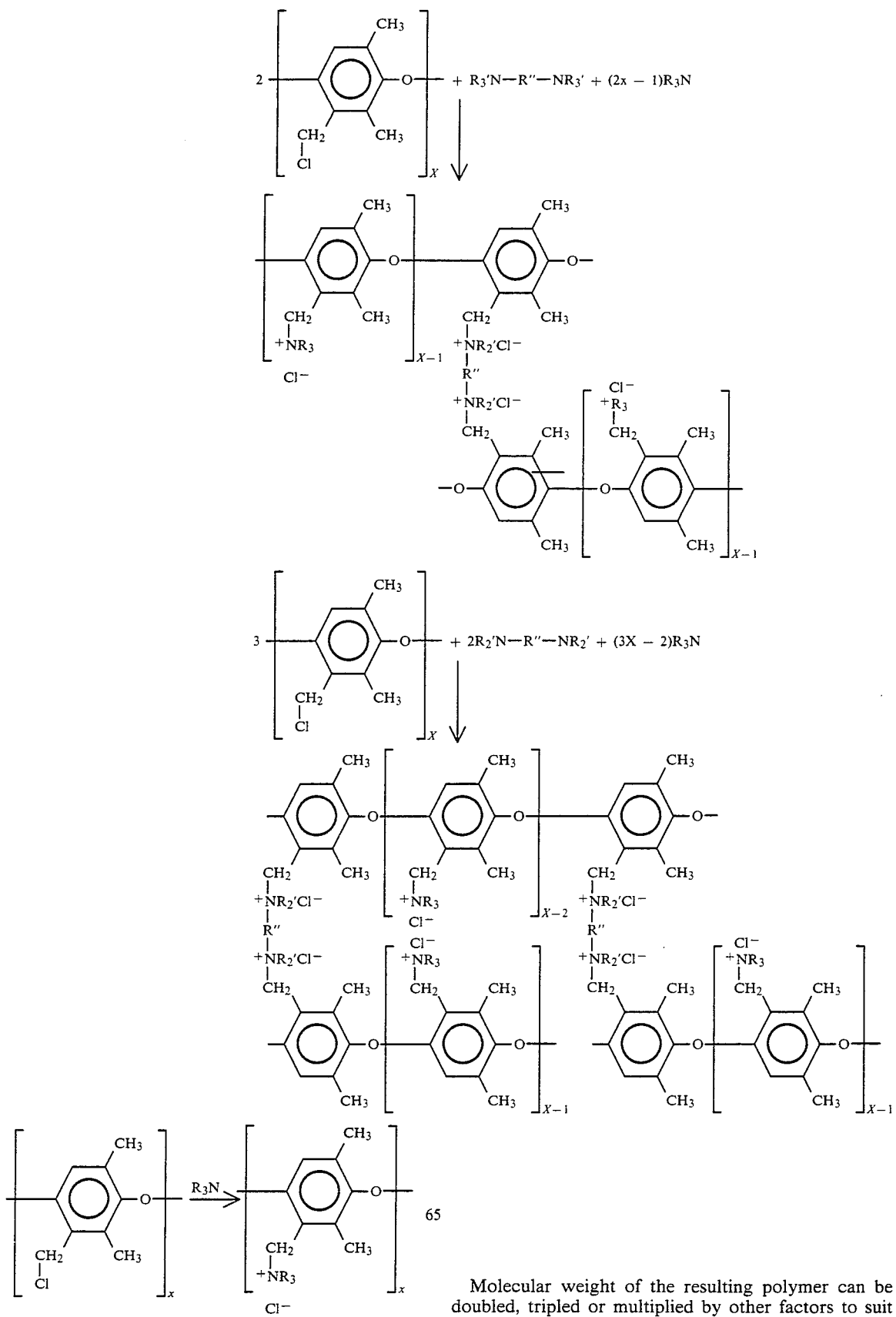
For more thickening power the molecular weight of the polymer can be increased by controlled cross-linking with a calculated amount of ditertiary amine.
Molecular weight of the resulting polymer can be doubled, tripled or multiplied by other factors to suit the end use. Excessive cross-linking, however, will result in insoluble but swellable polymer network. Based on the initial molecular weight and molecular weight distribution of the polymer, the degree of increase in polymer molecular weight can be controlled.

EXAMPLE 1

Chloromethylation of Poly-2,6-dimethyl-1,4-phenylene Oxide

Chloroform (30 ml) was placed in a 250 ml 2-neck round bottom flask fitted with a thermometer and refluxing condenser. With stirring at 25° C. was added slowly poly-2,6-dimethyl-1,4-phenylene oxide (6 g) ($M_{(N)}=32,000$). Stirring was continued until all solid passed into solution. Only then were 5 ml of glacial acetic acid added dropwise to the clear solutions. This was followed by 1 ml of concentrated hydrochloric acid and 2.75 g of S-trioxane. The mixture was stirred and heated to 57° C. under one atmospheric pressure of hydrogen chloride. After 3 hours of reaction additional trioxane (2 g) and additional chloroform (20 ml) were added. Stirring at 57° C. under the hydrogen chloride atmosphere was continued for 16 hours and a final addition of 2.75 g of S-trioxane then made. The mixture was heated and stirred for 8 hours longer under the hydrogen chloride blanket. The hydrogen chloride was shut off and the mixture brought to reflux. n-Hexane (125 ml) was then dropped into the boiling stirred solution. Refluxed for 1 hour after the hexane addition and then cooled slowly. The solid product was filtered and washed with two 100 ml portions of hexane. The precipitate was ground in a mortar and dried under vacuum. Yield; 7.5 g. % Cl found: 13.8%. % Cl calculated based on one chloromethyl group per one aromatic ring; 21.48%. Therefor, 64% of the aromatic rings are chloromethylated.

EXAMPLE 2

Improved Chloromethylation of Poly-2,6-dimethyl-1,4-phenylene Oxide

Chloroform (45 ml) was placed in a 250 ml 2-neck round bottom flask fitted with a thermometer and refluxing condenser. With stirring at 25° C. there was added slowly 9 g of poly-2,6-dimethyl-1,4-phenylene oxide (Mn=32,000). Stirring was continued until all solid went into solution. Only then were 7.5 ml of glacial acetic acid added dropwise to the clear solution. This addition stops short of precipitation. This addition was followed by 1.5 ml of concentrated hydrochloric acid and 4.1 g of S-trioxane. The mixture was stirred and heated to 57° C. under one atmosphere of hydrogen chloride. After 2 hours of reaction additional S-trioxane (2 g) and chloroform (20 ml) were added. Stirring at 57° C. under hydrogen chloride was continued for 16 hours and then another 4.1 g of S-trioxane were added with 4.0 ml of chloroform. After 24 hours more, 2 g of S-trioxane were added with 20 ml of chloroform. Refluxing continued for another 8 hours to give a total of 50 hours at reflux under a hydrogeun chloride atmosphere. The hydrogen chloride was shut off and the mixture brought to reflux. n-hexane (125 ml) was then dropped into the boiling stirred solution to precipitate the product. The solvents were decanted from the product which was then masked with three 150 ml washes of hexane. The crude product was dried in the flask on a Rotary Evaporator and stirred with 200 ml of chloroform at 25° C. until it formed a turbid solution. This solution was filtered through Celite to obtain a clear filtrate. The celite was washed with 50 ml of chloroform and solvent was evaporated from all filtrates to obtain 12.7 g of the purified chloromethylated polyphenylene oxide as a pale yellow solid. Analysis of this product showed:

%C=61.50; %H=5.43; %Cl=24.87.

This analysis indicates slightly more than one chloromethyl group per phenyl ring. The analysis for one chloromethyl group per benzene ring is calculated at:

%C=64.11; %H=5.38; %Cl=21.03.

EXAMPLE 3

Pyridine Quaternary Salt from Poly-2,6-dimethyl-1,4-phenylene Oxide

Pyridine (90 ml) was charged into a 500 ml 2-neck round bottom flask fitted with a condenser, dropping funnel, and a nitrogen blanket through the condenser. The pyridine was brought to flow refluxing with stirring. A solution of 3 g of chloromethylated poly-2,6-dimethyl-1,4-phenylene oxide, as prepared in Example 1, was made up in 40 ml of refluxing chloroform. This hot solution was added dropwise to the refluxing pyridine. After the addition the mixture was refluxed under nitrogen for 3 hours. The reaction mixture was then evaporated to dryness on a rotary evaporator at reduced pressure. The product (3.8 g) was treated with 150 ml of water at reflux for 3 hours to obtain a clear solution indicating that the resulting polymer is water soluble as expected for a strong polyelectrolyte. The viscosity of 2% polymer solution in distilled water was 744 centipoises at 7.3 sec$^{-1}$. In 1% NaCl the viscosity of 2% polymer solution was 50 centipoises at 7.3 sec$^{-1}$ indicating that the polymer is a brine thickener.

EXAMPLE 4

Controlled Cross-linked Pyridine Quaternary Salt from Example 1

160 ml of chloroform was placed in a 1 liter round bottom flask and to it was added slowly and with stirring 4.0 g of the chloromethylated poly-2,6-dimethyl-1,4-phenylene oxide as prepared in Example 1. The flask was blanketed with nitrogen. The mixture was heated to reflux with stirring under a condenser until dissolved. The reflux was stopped briefly to add dropwise with stirring 14.1 mg (0.125 mmole) of 1,2-bis-(4-pyridyl)ethane dissolved in 10 ml of chloroform. The mixture was then returned to reflux and held at reflux under nitrogen for 17 hours. Then 35.7 g of pyridine were run into the hot mixture. Refluxing was continued for 2 hours and the mixture allowed to cool for 1 hour. The clear solvents were decanted from the precipitate of crude product, and this precipitate was then dried by evaporation at reduced pressure. The yield of crude product was 5.8 g. It was dissolved by refluxing with stirring in 580 ml of water to make up a 1% solution. The solution appears viscous. Brookfield viscosities were measured: 957 cp at 1.83 sec$^{-1}$ in distillated H$_2$O; 54 cp at 1.83 sec$^{-1}$ in 1% NaCl solution.

EXAMPLE 5

Controlled Cross-linked Pyridine Quaternary Salt from Example 2

60 ml of chloroform was placed in a 250 ml round bottom flask equipped with a magnetic stir bar. A clear solution was prepared by slowly adding 1.88 g (0.0384 mmole) of chloromethylated poly-2,6-dimethyl-1,4-phenylene oxide from Example 2 with stirring at 25° C. For cross-linking at a ratio of 1.883 millimole of diamine per mole of the chloromethylated polyphenylene oxide, a solution of 13.3 mg of 1,2-bis-(4-pyridyl)ethane was prepared in 10 ml of chloroform. The solution of this diamine was dropped slowly into the stirred solution of the chloromethylated poly-2,6-dimethyl-1,4-phenylene oxide at 25° C. The mixture was then brought to a boil and held at reflux for 16 hours. It was cooled to 40° C. and 10.44 g (0.132 mole) of pyridine was added. The reaction mixture was then refluxed for 5 hrs. A button of product was formed. This product was isolated by decantation and washed with three 20 ml portions of chloroform. Finally, the button of crude product was dried on the Rotary Evaporator; dried weight, 3.17 g. This quaternary salt was dissolved in 150 ml of water for purification by dialysis.

A 0.3% (Wt./V) solution of the dialyzed and free dried polymer gave a viscosity at a shear rate of 5.75 sec$^{-1}$ of 58 cp in distilled H$_2$O and 9 cp in 1% NaCl.

EXAMPLE 6

Controlled Cross-linked Trimethylamine Quaternary Salt from Example 2

60 ml of chloroform was placed in a 250 ml round bottom flask equipped with a magnetic stirrer. A clear solution was prepared by slowly adding 2.49 g (0.0553 mmole) of chloromethylated poly-2,6-dimethyl-1,4-phenylene oxide from Example 2 with stirring at 25° C. For cross linking at a ratio of 1.71 millimole of diamine per mole of the chloromethylated polyphenylene oxide, a solution of 17.8 mg of 1,2-bis-(4-pyridyl)ethane was prepared in 10 ml of chloroform. The solution of this diamine was dropped slowly into the stirred solution of the chloromethylated poly-2,6-dimethyl-1,4-phenylene oxide at 25° C. The mixture was stirred for 16 hours at 25° C. It was then refluxed for 4 hours and allowed to cool to 25° C. The reaction mixture was treated with trimethylamine gas for 4 hours, and allowed to stand for 16 hours with the solution containing trimethylamine. The crude product appeared as a green button. It was isolated by decantation and washed with two 50 ml portions of chloroform. The button of product was dried on the Rotary Evaporator; dried weight, 3.37 g. This quaternary salt was dissolved in 150 ml of water for purification by dialysis.

A 0.3% (Wt/V) solution of the dialyzed and freeze dried polymer gave a viscosity at a shear rate of 5.75 sec$^{-1}$ of 40.8 cp in distilled H$_2$O and 14 cp in 1% NaCl.

Solutions of the novel water-soluble polymers of this invention are primarily used in the tertiary recovery of petroleum from spent oil wells. As an example of this, a solution of the polymer of up to about 2 percent concentration is introduced by injection into an oil-bearing formation. A surfactant such as petroleum sulfonate (alkyl polyethoxypropane sulfonate) may then be mixed with the novel water soluble polymer in concentrations of up to 2 percent. However, the invention is not limited to the above concentrations or methods. The polymer is added to water injected into the oil-containing formation in a sufficient amount and concentration to effectively thicken the water so as to provide improved efficiency in driving the oil through the formation to the production well. Generally from about 0.1 to about 5 percent of the polymer described herein is used.

The polymers of the present invention, because of their thermal, chemical and brine stabilities, are good candidates for mobility control in enhanced oil recovery. Their thermal and brine stability also make them good polymer candidates in drilling fluids.

Cross-linked polymers are also thermally stable ion-exchange materials.

What is claimed is:

1. A water soluble polymer of the formula $$H\!-\!R_1\!-\!H \qquad (I)$$

wherein R$_1$ is a stiff polymeric backbone consisting essentially of repeating units selected from the group consisting of

(II)

(III)

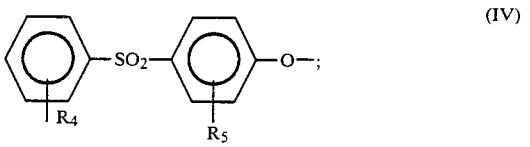

(IV)

where R$_2$, R$_3$, R$_4$ and R$_5$ comprise hydrogen and moieties of the formula

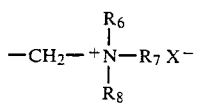

where X is halogen and R$_6$, R$_7$ and R$_8$ are the same or different and are C$_1$-C$_{20}$ hydrocarbyl groups, provided that R$_8$ is absent when the moiety $$\begin{array}{c} R_6 \\ | \\ N\!-\!R_7 \end{array}$$

forms a pyridyl ring, further provided that said

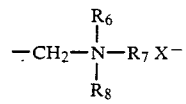

moieties are present in an amount sufficient to solubilize said polymer (I), said polymer (I) being water insoluble if all of $R_2$, $R_3$, $R_4$ and $R_5$ were hydrogen.

2. A polymer according to claim 1, wherein at least 10% of the $R_2$, $R_3$, $R_4$ and $R_5$ moieties present are not hydrogen.

3. A polymer according to claim 1, wherein

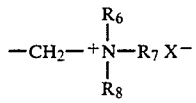

is of the formula

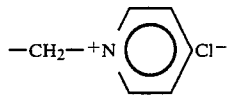

or

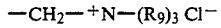

where $R_9$ is $C_1$-$C_4$ alkyl.

4. A polymer according to claim 1, wherein said repeating units are of the formula

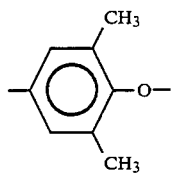

and

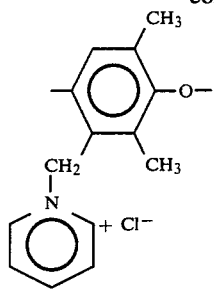

where the number of said units of formula (VI) is from about 60 to about 70% of the total number of said units of formulae (V) and (VI) and wherein the Mn of said polymer is from about 40,000 to about 200,000.

5. A method for chemically linking quaternary ammonium groups to a stiff chain, thermally stable polymer selected from the group consisting of poly-2,6-dimethyl-p-phenylene oxide, polysulfone, and poly(p-phenylene ether-sulfone), said method comprising the steps of:
(i) halomethylating said polymer; and
(ii) quaternizing halomethyl groups obtained from said halomethylating step (i).

6. A method according to claim 5, wherein said halomethylating step (i) is a chloromethylating step.

7. A method according to claim 5, wherein at least 40% of the phenyl rings of said polymer are halomethylated in said halomethylating step (i) and at least 50% of the halomethyl groups obtained according to said halomethylating step (i) are quaternized according to said quaternization step (ii).

8. A method according to claim 5, wherein, according to said quaternizing step (ii), said halomethylated polymer obtained according to said halomethylating step (i) is reacted with an amine which is pyridine, substituted pyridine or of the formula

where $R_{10}$, $R_{11}$ and $R_{12}$ are the same or different and are $C_1$-$C_{20}$ hydrocarbyl groups.

9. A method according to claim 5, wherein, according to said quaternizing step (ii), said halomethylated polymer obtained according to said halomethylating step (i) is reacted with a diamine capable of crosslinking said polymer.

10. A method according to claim 6, wherein, according to said quaternizing step (ii), said halomethylated polymer obtained according to said halomethylating step (i) is reacted with 1,2-bis(4-pyridyl)ethane.

11. A crosslinked polymer according to the method of claim 9 or 10.

* * * * *